(12) United States Patent
Dixon (10) Patent No.: US 9,045,174 B2
(45) Date of Patent: Jun. 2, 2015

(54) FLEXIBLE MUD FLAP HANGER-BRACKET

(75) Inventor: Ian A. Dixon, Nashville, TN (US)

(73) Assignee: Fontaine Spray Suppression Company, Springfield, TN (US)

( * ) Notice: Subject to any disclaimer, the term of this patent is extended or adjusted under 35 U.S.C. 154(b) by 346 days.

(21) Appl. No.: 13/435,287

(22) Filed: Mar. 30, 2012

(65) Prior Publication Data

US 2013/0256483 A1    Oct. 3, 2013

(51) Int. Cl.
*B62D 25/18*    (2006.01)

(52) U.S. Cl.
CPC ............ *B62D 25/188* (2013.01); *B62D 25/182* (2013.01)

(58) Field of Classification Search
USPC ............. 280/154, 847, 851, 159; 248/220.21, 248/220.22, 221.11, 222.11, 223.41, 224.7, 248/224.8, 225.21
See application file for complete search history.

(56) References Cited

U.S. PATENT DOCUMENTS

| | | | | |
|---|---|---|---|---|
| 2,683,612 A * | 7/1954 | Bacino | ........................... | 280/851 |
| 3,388,884 A * | 6/1968 | Eggler et al. | ............. | 248/222.11 |
| 3,934,901 A * | 1/1976 | Hammerly | ..................... | 280/851 |
| 3,954,281 A * | 5/1976 | Juergens | ........................ | 280/851 |
| 4,189,165 A * | 2/1980 | Leonard et al. | ............... | 280/851 |
| 4,326,727 A * | 4/1982 | Rock | .............................. | 280/851 |
| 4,335,862 A * | 6/1982 | Sherman | .................. | 248/289.11 |
| 4,354,690 A * | 10/1982 | Hanson | ........................ | 280/851 |
| 4,453,728 A * | 6/1984 | Verge | ............................. | 280/851 |
| 4,541,646 A * | 9/1985 | Knowley | ....................... | 280/851 |
| 4,627,594 A * | 12/1986 | Reed | ............................... | 248/632 |
| 5,833,254 A * | 11/1998 | Bucho | ........................... | 280/154 |
| 6,484,984 B2 * | 11/2002 | Hawes | ..................... | 248/220.21 |
| 7,040,662 B2 * | 5/2006 | Barr et al. | ...................... | 280/847 |
| 2005/0110266 A1 * | 5/2005 | Barr et al. | ...................... | 280/847 |
| 2008/0185810 A1 * | 8/2008 | Archer et al. | ................. | 280/154 |
| 2012/0298814 A1 * | 11/2012 | Dixon | ........................ | 248/205.1 |

* cited by examiner

*Primary Examiner* — Terrell McKinnon
*Assistant Examiner* — Michael McDuffie
(74) *Attorney, Agent, or Firm* — DLA Piper LLP (US); R. Blake Johnston (57) ABSTRACT

Mud flap hanger is disclosed which includes a post member that is configured to allow attachment of the hanger to a vehicle and a hanger arm extending from the post member having a flexible core of a composite material, for example, a fiber-reinforced plastic (FRP) and that is clad with a substantially inelastic polymer. Preferably, the hanger arm is formed with a cross-section shape of a polygon so that clips for hanging the mud flap from the arm may be conformed to that polygonal shape.

7 Claims, 11 Drawing Sheets

FLEXIBLE MUD FLAP HANGER-BRACKET

BACKGROUND

1. Field

The present invention relates generally to means for suspending mud flaps from vehicles, and particularly, to flexible hangers for suspending mud flaps from vehicles.

2. Description of the Problem and Related Art

Virtually all vehicles operated on public highways are required by state law to be equipped with means for intercepting mud, water spray, gravel, etc., thrown rearward by the vehicle's wheels, the purpose being to protect following vehicles from damage and from obscured vision which could cause accidents.

Trucks and trailers may satisfy this requirement by hanging mud flaps rearward of exposed wheels. Depending upon the size and number of wheels, the mud flaps may be as large as two feet wide and three feet long. They are generally constructed of a comparatively thick sheet of tough, resilient material for strength and are sufficiently heavy not to sail out rearward at high vehicle speeds. Many types of vehicles have no structure above the exposed wheels, so it is necessary to cantilever mud flap hangers outwardly from frame members inwardly of the wheels. Mud Flaps are typically made from plastic or rubber in the form of a 0.19-0.5 inch thick sheet, and are 24 inches wide by 24-36 inches in height. A majority of mud flaps have a straight top with four holes for installation. The other popular mud flap style has an angled, or chamfered, top corner with two holes on the horizontal top edge and two-to-three holes on the angled edge. The angled version offers more clearance for trailer components.

In normal highway use, cantilevered mud flap hangers are subject to continual up and down flexing at or near the vehicle attachment point, caused by the weight of the mud flap and the bouncing and pitching of the vehicle to which they are attached. When inner ends of the hangers are rigidly attached to the vehicle or where there are 90 degree bends near the attachment point, such constant flexing rapidly causes metal fatigue and work hardening, with resultant breaking of the hanger often in only a very few months of service. One solution to this problem was addressed by U.S. Pat. No. 2,970,849 to Betts, which discloses a steel, cantilevered hanger configured with a spring coil outward of the 90 degree bend designed to permit the hanger to flex somewhat. Such a hanger is made from spring grade steel, hardened to retain its shape, and later derivatives of this design have the spring portion oriented vertically to permit more flexing in the vertical plane. Yet, despite its hardness, the hanger in the field is often bent as a result of the hanger accidentally contacting some object, e.g, a trailer, a pole, etc. An alternative cause for bending comes from pinching the mud flap between the tire and an object on the ground when the vehicle backs up. The pinched mud flap rolls around the tire and pulls the hanger down with significant force.

Testing has shown that conventional steel cantilevered hangers, even those with a spring portion, will fail just from normal road vibration at a point near the 90 degree bend above the chassis mount. The result is very undesirable, not only because the lost hanger and mud flap must be replaced, but also because following vehicles may be hit by the falling hanger and mud flap or may cause an accident by swerving to miss a falling or fallen hanger and mud flap. Furthermore, producing such hangers is expensive because special materials and heat treatment are required and, if the heat treatment is improper, the spring may be too weak and allow the mud flap to sag into contact with the wheels or the pavement, or the spring may be too brittle and break. Finally, being made of steel, the conventional cantilevered hanger is heavy and susceptible to corrosion.

Accordingly, a mud flap hanger assembly is needed which is lightweight, inexpensive, and yet resilient enough to withstand vibration and the other myriad stresses from which conventional mud flap hangers currently fail.

SUMMARY

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

Mud flap hanger according to the disclosure herein includes a post member that is configured to be received by a vehicle chassis mounting bracket and retention means, for example, a clip, for engaging the bottom of the mounting bracket and retaining said post member within the mounting bracket. The hanger also includes a laterally extending hanger arm connected at one end to the post member and formed with a flexible core of a composite material, for example, a fiber-reinforced plastic (FRP) that is clad with a substantially inelastic polymer. Preferably, the hanger arm is formed with a cross-section shape of a polygon so that clips for hanging the mud flap from the arm may be conformed to that polygonal shape.

In one embodiment, the hanger apparatus includes a post member that is retained in the mounting bracket with a removable clip that is seated on a lower end of the post member, engaging both the post member and the bottom ledge of the mounting bracket to prevent the post from backing out of the bracket.

In a further embodiment, the post is configured with a protrusion and the clip includes a hole for receiving the protrusion, preventing the clip from becoming disengaged from the post member lower end.

In yet another embodiment, the hanger arm is comprised of two sections joined at an angle in order to suspend mud flaps having angled top edges.

In yet another embodiment, the post member is configured with a hollow bore for receiving a fastener through a chassis frame member In still another embodiment, the two sections are coupled together in a manner to allow selective positioning of one section of the hanger arm relative to the other.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the present invention and their advantages are best understood by referring to FIGS. 1 through 12 of the drawings. The elements of the drawings are not necessarily to scale, emphasis instead being placed upon clearly illustrating the principles of the invention. Throughout the drawings, like numerals are used for like and corresponding parts of the various drawings.

Reference in the specification to "an embodiment," "one embodiment," "various embodiments," or any variant thereof means that a particular feature or aspect of the assembly described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "front," "forward," "lateral," or "outward," or the like, and derivatives thereof are to be understand in relation to the truck or vehicle on which the assembly is to be mounted. However, it is to be understood that the invention may assume various alternative orientations, except where expressly specified to the contrary. It is also to be understood that the assemblies or articles illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
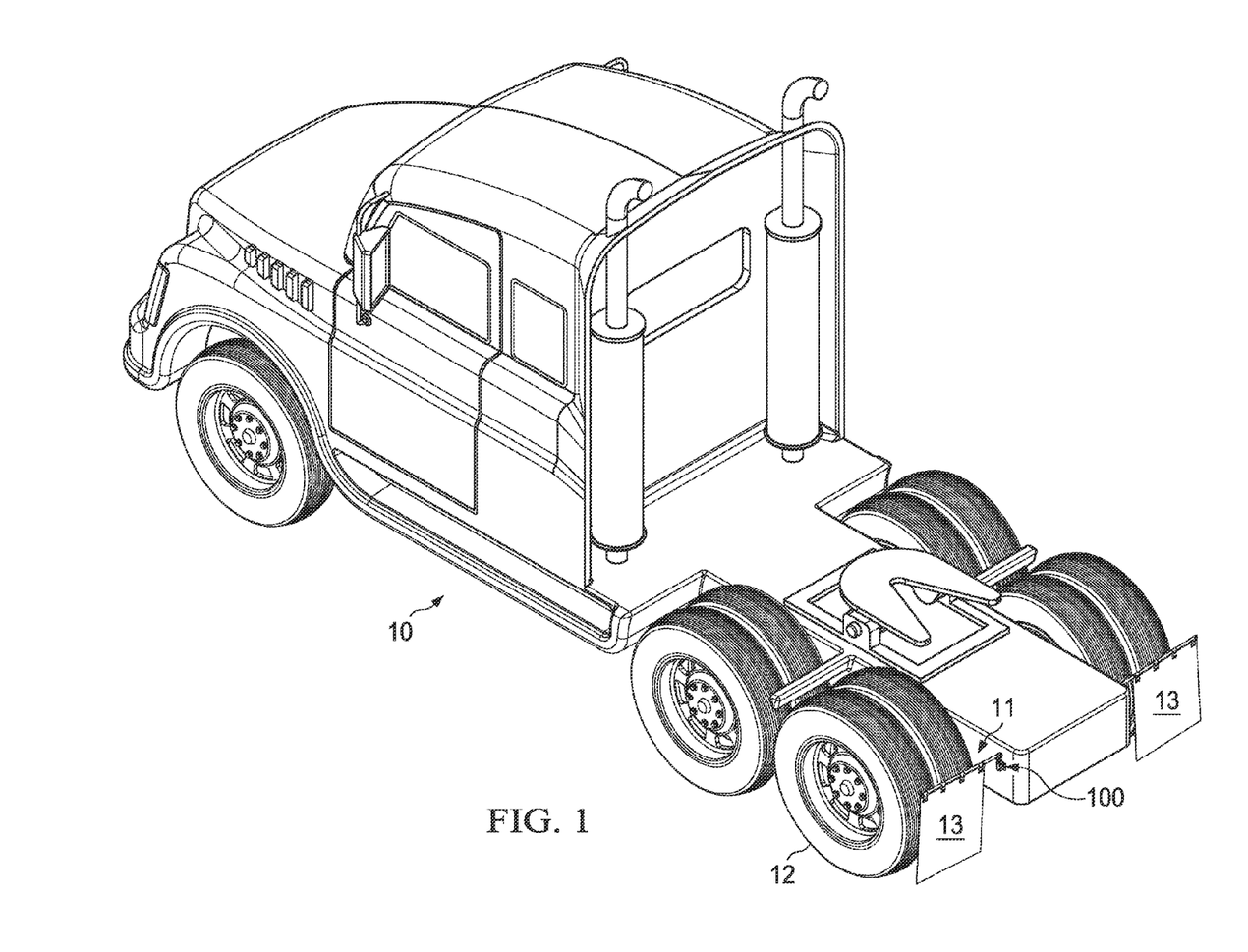
FIG. 1 is a perspective view of a vehicle with mud flap assemblies mounted to the vehicle chassis.
Figure 2A:
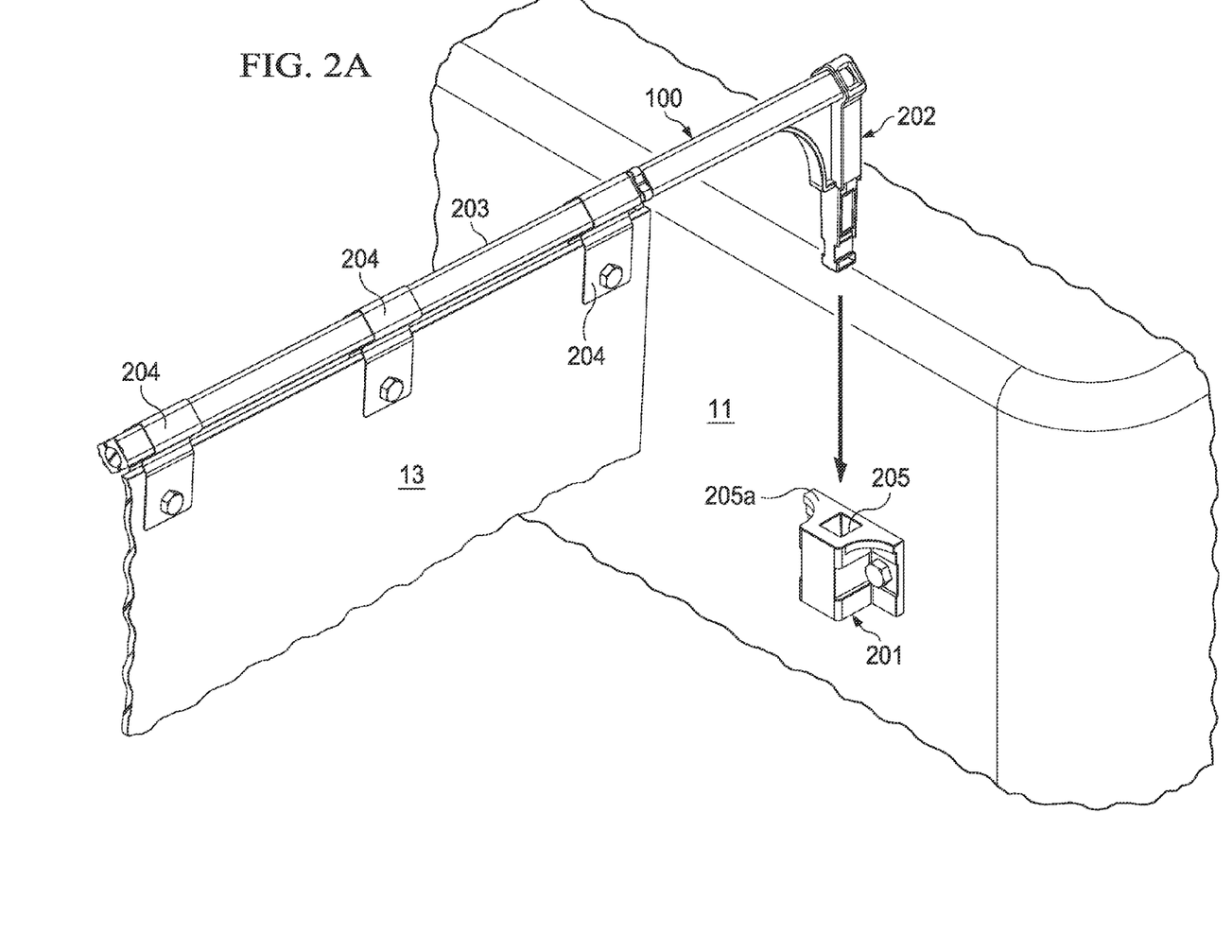
FIGS. 2A & 2B depict an exemplary flexible mud flap hanger according to one embodiment thereof.
Figure 2B:
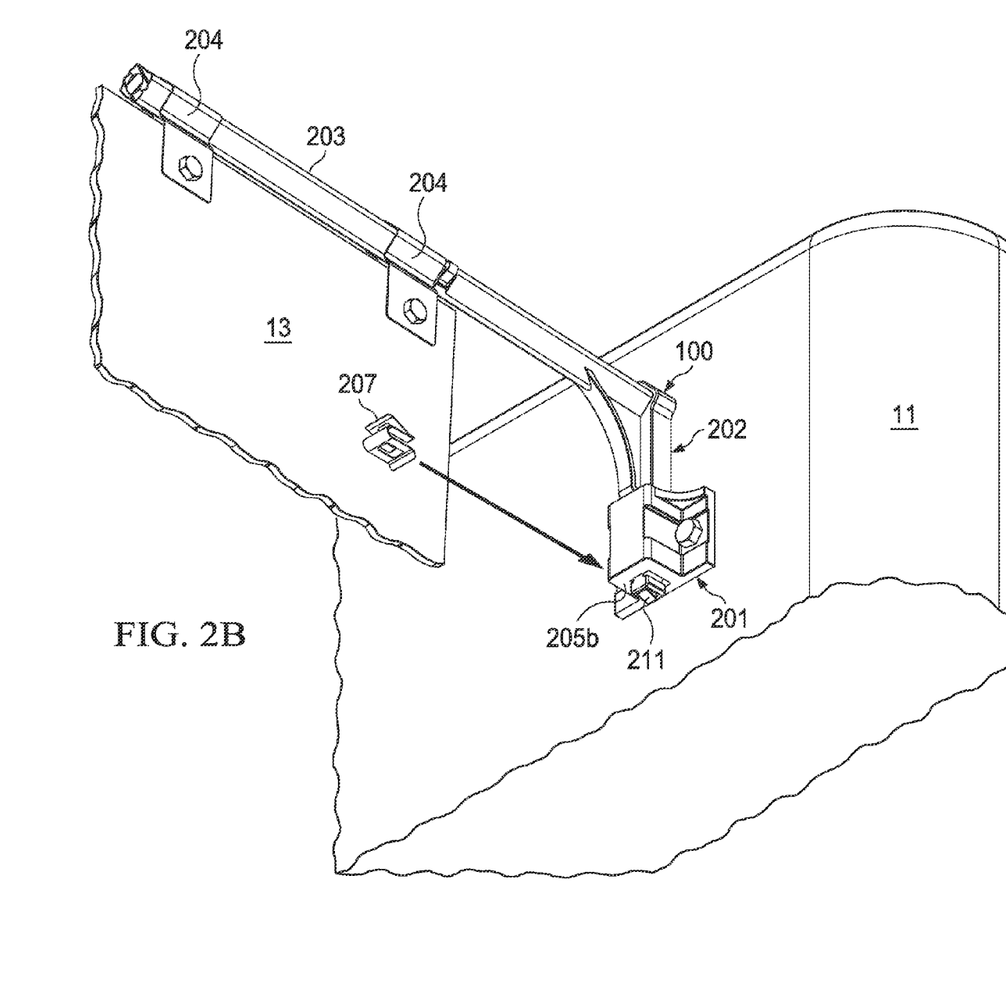
Figure 3:
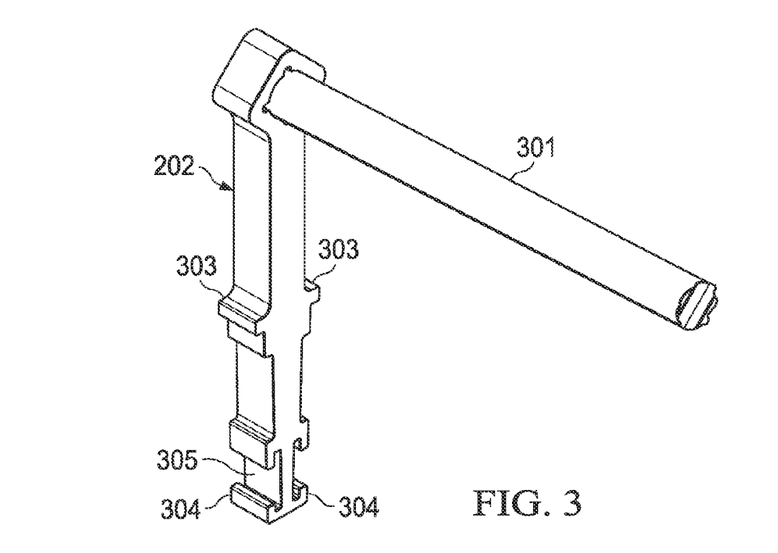
FIG. 3 is a perspective view of a portion of the embodiment of the flexible mud flap hanger of FIGS. 2A & 2B.

FIG. 1 simply depicts a vehicle 10 with a vehicle chassis comprised of longitudinal frame members 11. Attached to respective lateral frame members 11 are laterally extending mud flap hangers 100 which support the suspension of mud flaps 13 behind respective vehicle wheels 12. FIGS. 2A and 2B are an isolated view of one exemplary embodiment of the claimed mud flap hanger 100. In this embodiment, a mounting bracket 201 is fastened to the vehicle chassis along the frame member 11 and is configured with a channel, or hole, 205 having an opening at either end 205a, b. The hanger 100 includes a post member 202 having one end that is inserted into the bracket channel 205 and an opposite end from which extends a flexible, lightweight hanger arm 203 from which the mud flap 13 is suspended. Referring to FIG. 3, the mud flap hanger comprises a flexible rod 301 as a core. The rod 301 is preferably formed from a composite material, for example, fiber-reinforced polymer (FRP), including glass fiber-reinforced polymers (GRP), and polymers reinforced with aramid fiber, and carbon fiber, as would be appreciated by those skilled in the relevant arts. For reference, the exemplary rod 301 preferably possesses flexibility similar to that of a fiberglass golf flag pin. The post member 202 may comprise a metal, e.g., aluminum, and is optionally formed with flanges 303 located roughly midway along its body and extending perpendicularly from the post member 202 to seat against the ledge defining the channel opening 205a.

Figures 4, 5A, 5B:
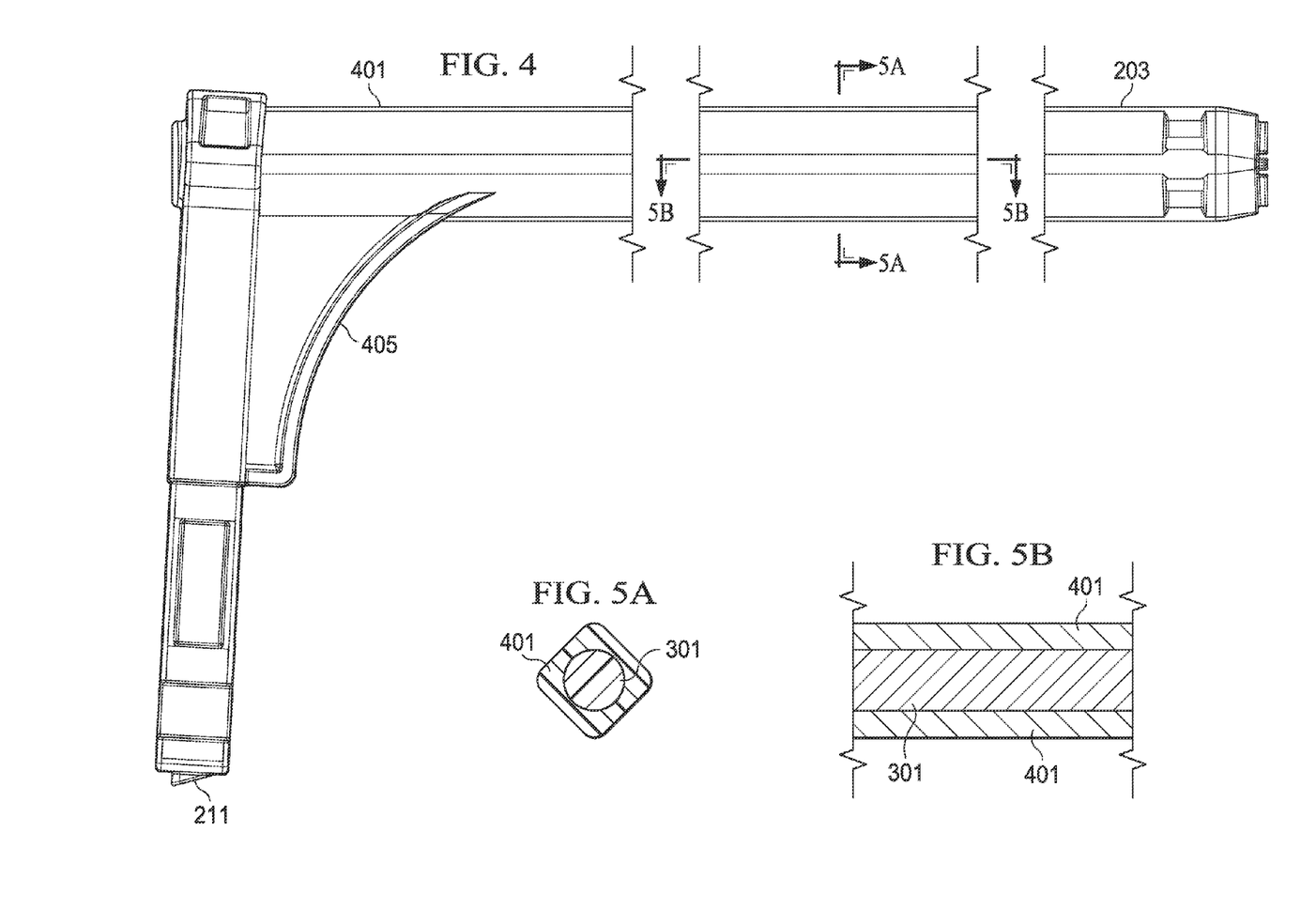
FIG. 4 is a side view of an exemplary flexible mud flap hanger.
FIGS. 5A & 5B are section views of the flexible mud flap hanger of FIG. 4 as indicated.
Figures 6, 7, 7A:
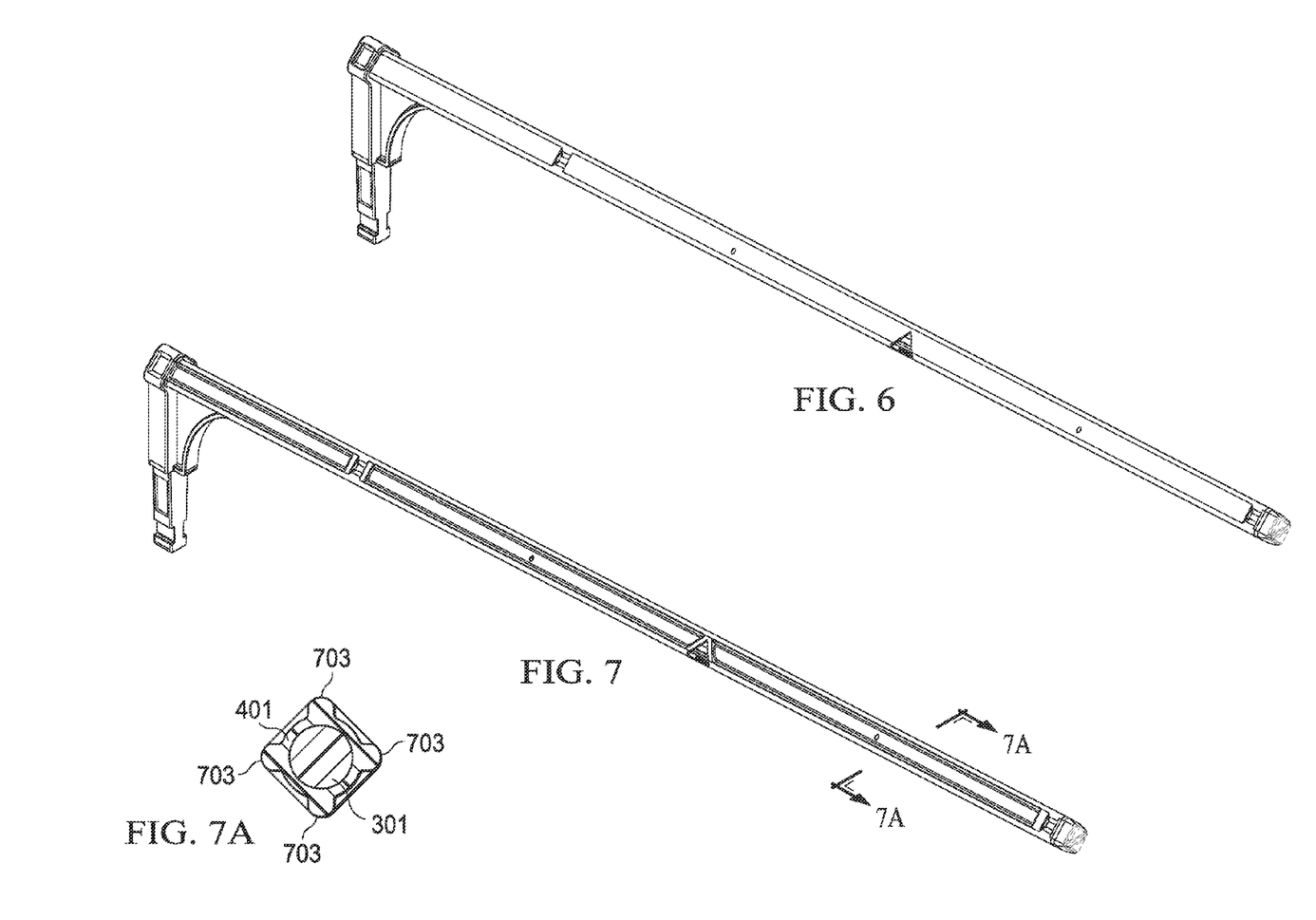
FIGS. 6 & 7 are perspective views of exemplary flexible mud flap hangers.
FIG. 7A is a section view of the embodiment depicted in FIG. 7 as indicated.

The exemplary hanger 100 also comprises a relatively rigid, lightweight polymer cladding 401 which may be molded to encase the rod 301, and optionally, the metal post member 202 as well. The cladding 401 is preferably shaped to give the hanger arm 203 a polygonal cross-section (See FIG. 5A), e.g., a diamond, rhombus, or other polygon. Further, the cladding may be molded to provide extra cladding material 703 at the polygon vertices (See FIGS. 7 & 7A) so as to add a structure to damp flexing of the hanger arm 203 in those planes of motion, and additional material between the post member 202 and the hanger arm 203, e.g., a gusset 405, to provide support in the plane in which the load from the mud flap 13 is experienced.

Figure 8A:
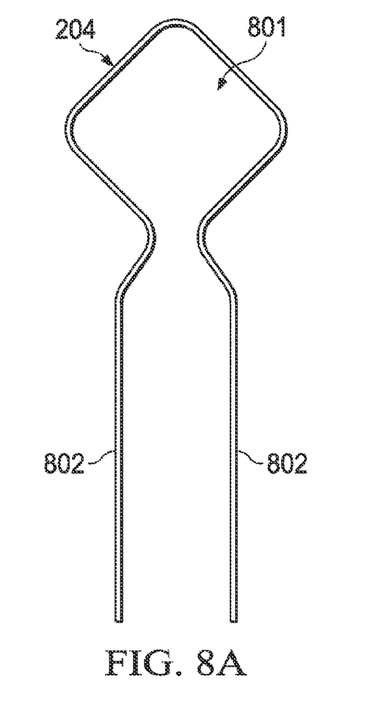
FIG. 8A is an elevational view of an exemplary hanger clip.
Figure 8B:
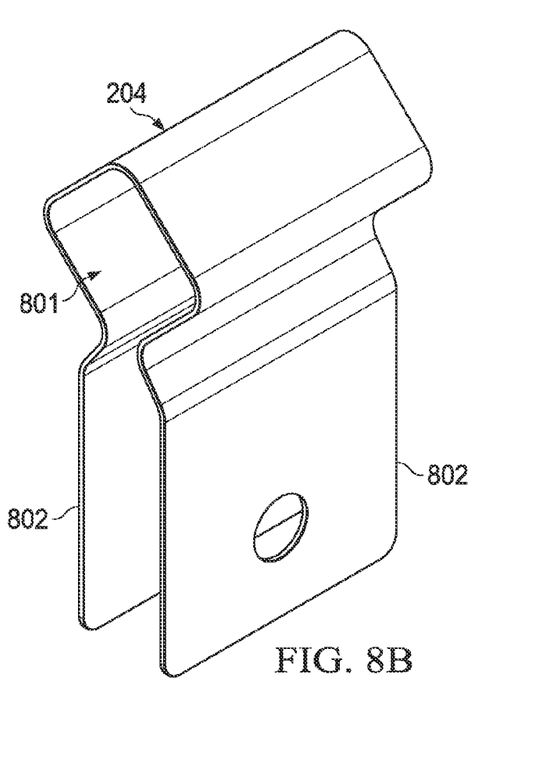
FIG. 8B is a perspective view of an exemplary hanger clip.

The hanger 100 also preferably includes a plurality of hanger clips 204 that attach to the mud flap 13 and suspend the flap 13 from the hanger arm 203. The hanger clips 204 include a shaped portion 801 that generally conforms to the shape of the hanger arm 203 cross-section to restrict rotation of the clips and thus the mud flap 13, and one or more flanges 802 configured to allow attachment to the mud flap 13.

Figure 9A:
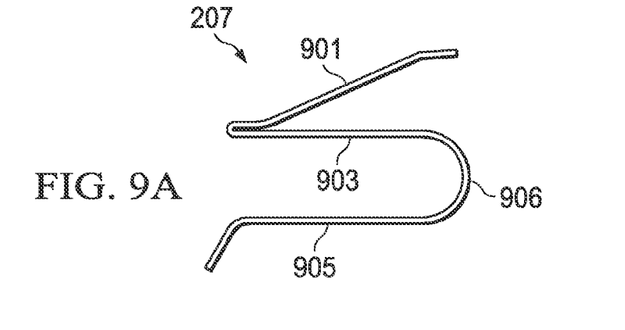
FIGS. 9A, 9B, and 9C are an elevational view, a top perspective view, and a bottom perspective view of an exemplary spring clip.
Figure 9B:
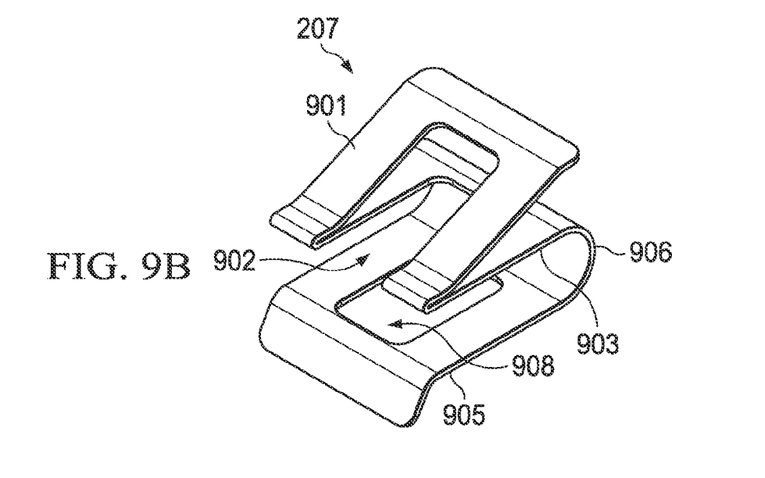
Figure 9C:
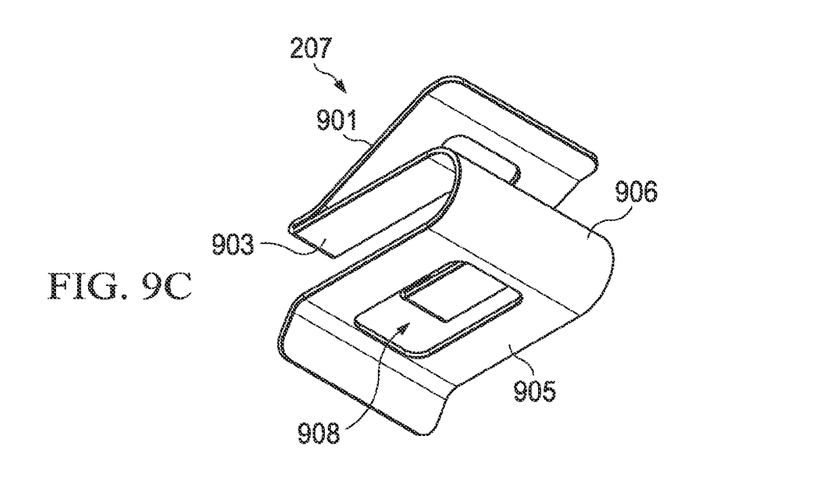
Figure 9D:
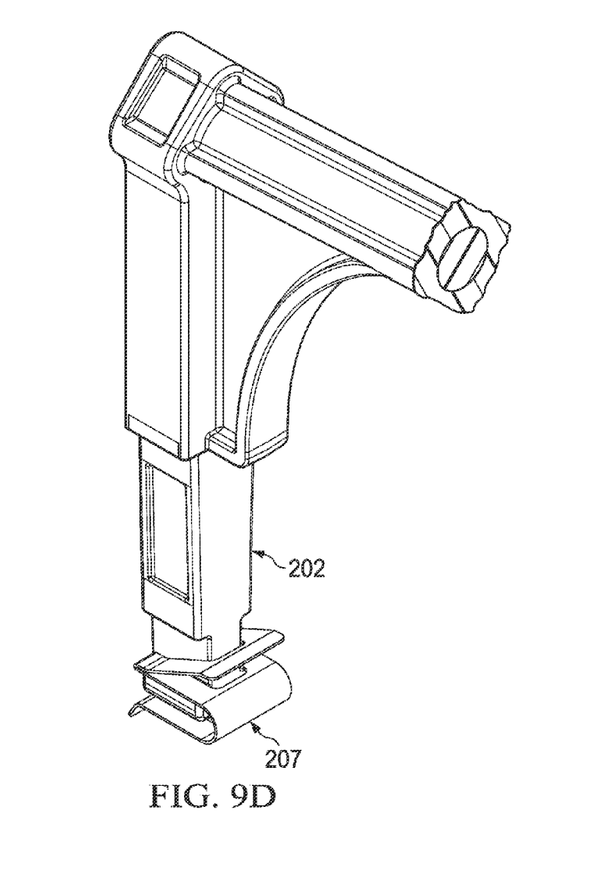
FIG. 9D illustrates an exemplary spring clip installed on a flexible mud flap hanger post.

In this embodiment, a portion of the post member 202 extends through opening 205b in the bracket channel 205. In addition, the post member 202 is formed with a narrow portion 305 and flanges 304 extending perpendicularly from the post member 202 on the end opposite the end from which the rod 301 extends. This embodiment advantageously includes a removable spring clip 207 to retain the post member 202 in the channel 205. Referring to FIGS. 9A through 9C, clip 207 may be formed to include an expanding spring tab 901 biased away from a generally parallel base portion 903. The spring tab 901 and the base portion 903 are configured with a generally u-shaped cut-out 902 in one plane (See FIG. 9B). The u-shaped opening 902 is dimensioned to receive the narrow portion 305 of the post member 202 extending from the opening 205b in the bracket channel 205 as shown in FIG. 9D. It can be seen that when installed, the base portion 903 is seated upon one set flanges 304b extending from the end of the post member 202, and the spring tab 901 is biased against the ledge of the bracket 201 defining the opening 205b of the channel 205. In this way, the post member 202 is prevented from backing out of the channel 205 and falling off of the vehicle. Finally, the clip 207 includes a second parallel tab 905 extending from a generally u-shaped transition 906 from the base portion 903. The second tab 905 is configured with an opening 908 for receiving a protrusion 211 that extends axially from the end from the post member 202. Thus installed, the clip 207 is retained in position. The clip 207 is intended to be easily installed and removed, and thus, is preferably formed from a relatively rigid material, metal or plastic, with sufficient flexibility to be easily, momentarily deformed, but with good resiliency to allow the spring tab 901 to maintain its bias against the bracket 201, and retention of the protrusion 211 within the opening 908, as would be understood by those skilled in the relevant art.

Figure 10:
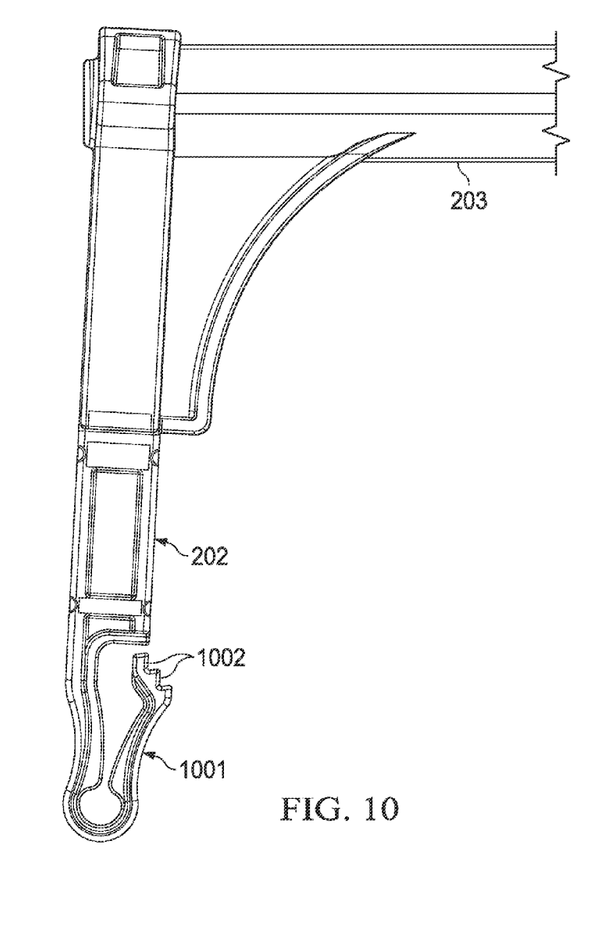
FIG. 10 is a side view of another exemplary embodiment of the flexible mud flap hanger.

A further embodiment, includes a variation on the method of retaining the post member 202 in the bracket 205 shown in FIG. 10, in which the post member 202 is formed with a spring latch 1001 extending axially from the end of the post member 202 and is resilient. The latch 1001 may be formed from the cladding encasing the post member 202 including a u-shaped turn and terminating with an end having one or more detents 1002. When the post member 202 is inserted in the channel 205, the latch 1001 extends through the opening 205*b*, and the detents 1002 engage the ledge defining the opening 205*b* in the bracket 201 preventing the post member from leaving the channel 205.

Figures 11, 11A:
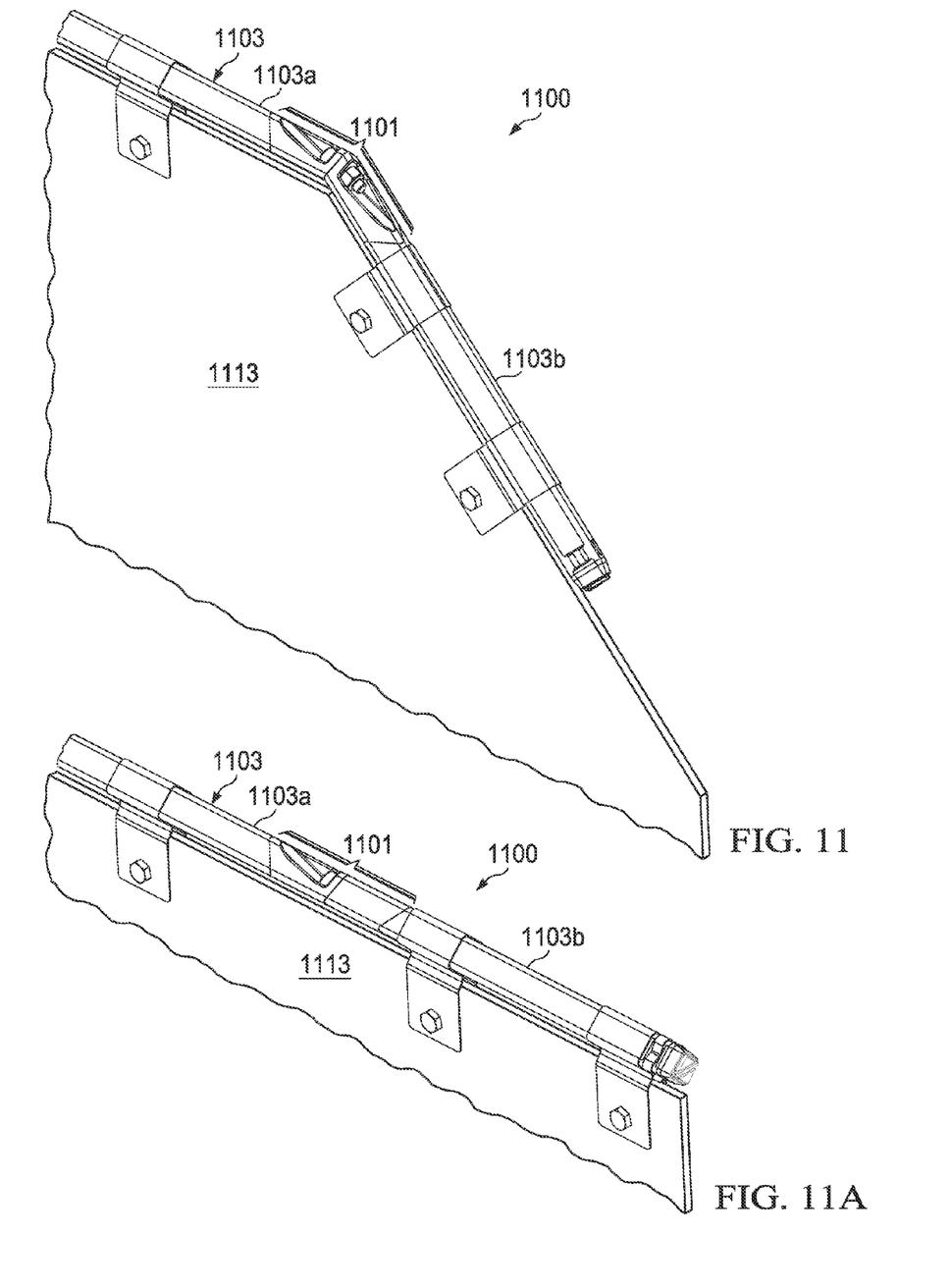
FIGS. 11 & 11A are perspective partial views of yet another exemplary embodiment of the flexible mud flap hanger.

With reference to FIGS. 11 & 11B, the hanger 1100 may also be adapted to support mounting mud flaps 1113 having angled edges. In this embodiment, hanger arm 1103 is comprised of two sections 1103*a*, 1103*b*, joined at adjacent ends by a coupling 1101 which holds the angled section 1103*b* at an obtuse angle with respect to the parallel section 1103*a*. Preferably, coupling 1101 is adjustable to allow repositioning of sections 1103*a*, b from angled to straight and vice-versa. This feature may be achieved with a coupling similar to a ball and socket.

Figure 12:
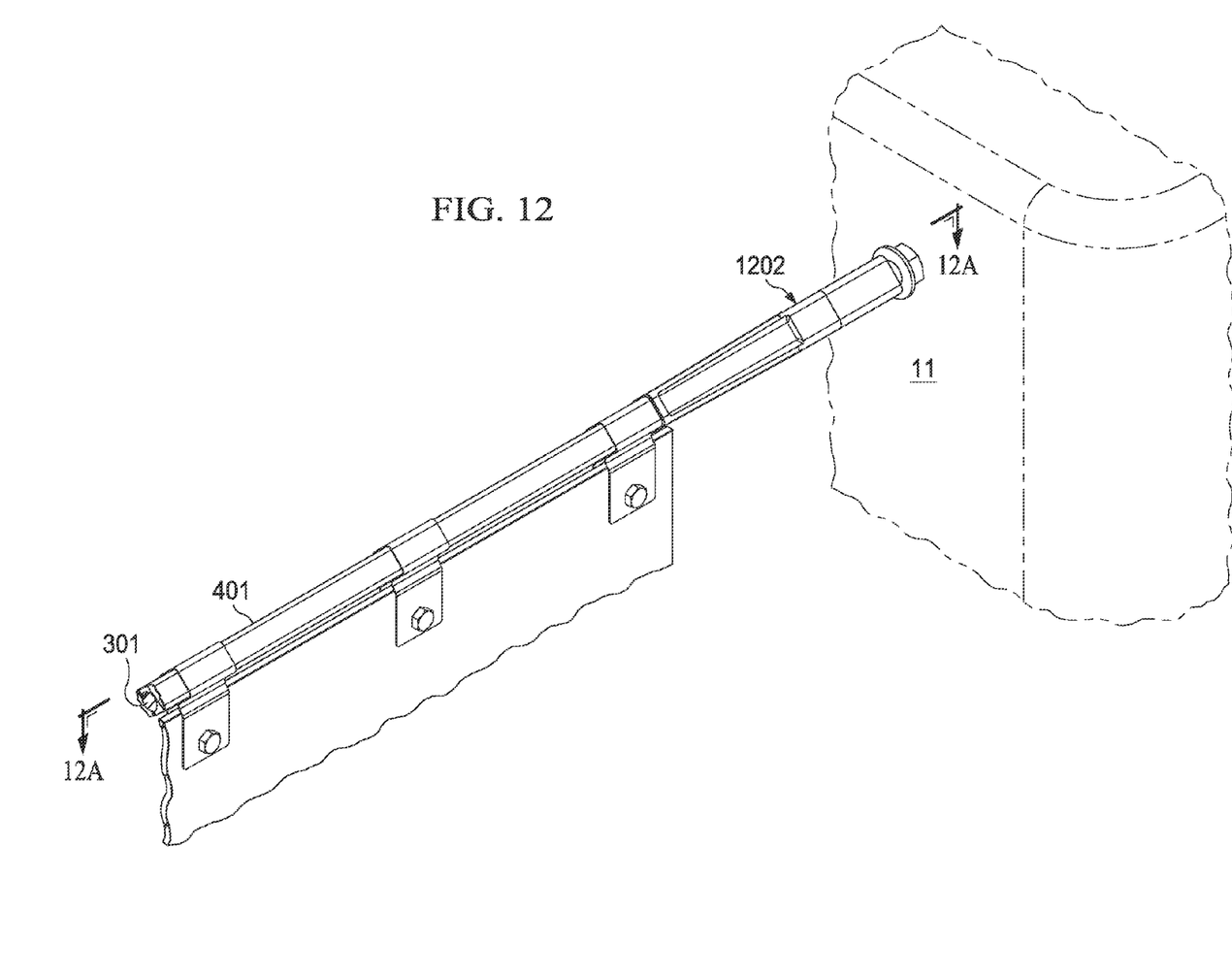
FIG. 12 is a perspective view of a further exemplary embodiment of a flexible mud flap hanger.
Figure 12A:
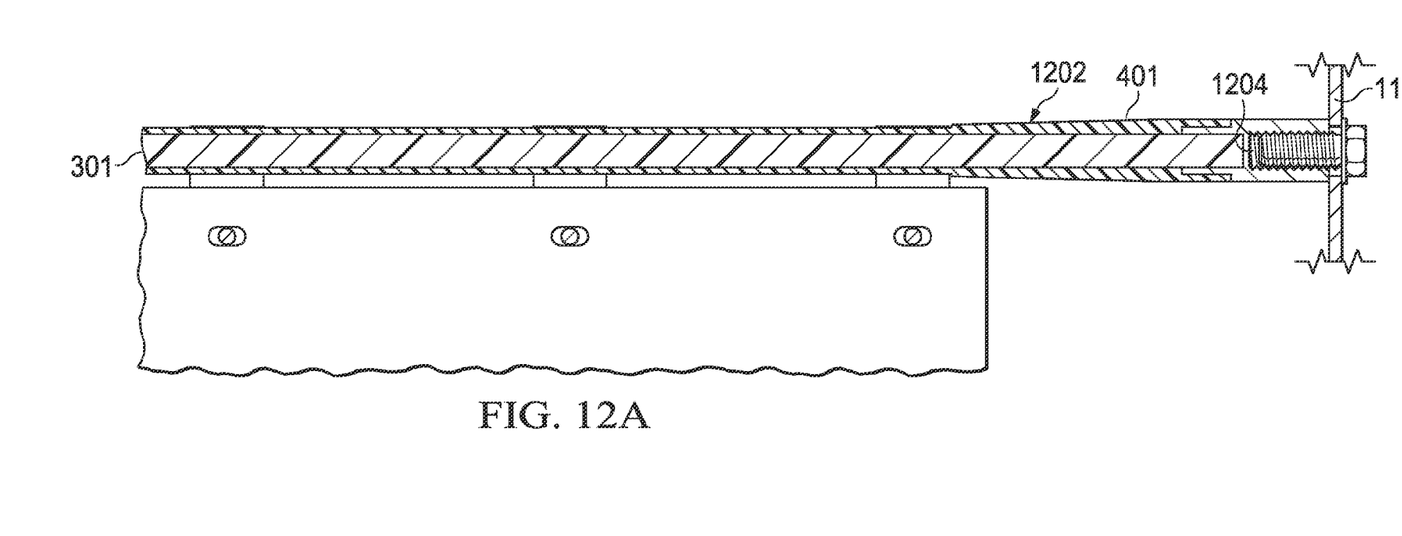
FIG. 12A is a section view of the mud flap hanger of FIG. 12 as indicated.

With reference to FIGS. 12, and 12A, another variation is disclosed in which the post member 1202 is configured with a hollow bore 1204 for receiving a fastener through the chassis frame member 11. Again, post member 1202 is preferably encased in cladding 401 along with the flexible rod 301 in order to provide support.

As described above and shown in the associated drawings, the present invention comprises an apparatus for a flexible mud flap hanger bracket. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. Mud flap hanger comprising:
   an elongated hanger arm comprising:
   an elongated, flexible core formed from a fiber-reinforced polymer material; and
   a polymer cladding encasing said elongated core, said cladding being substantially inelastic relative to said elongated core; and
   wherein said hanger arm is configured with a generally polygonally-shaped cross-section;
   a plurality of clips for suspending a mud flap from said hanger arm, said clips shaped to conform to said polygonally-shaped cross-section;
   a post member connected at one end to one end of said hanger arm for attaching said mud flap hanger to a vehicle, said post member having a lower end including a lower flange and a downward protrusion; and
   a removable expanding clip configured to be installed on said post lower end between said lower flange and the bottom of a mounting bracket, said removable expanding clip including an aperture for receiving said downward protrusion in order to prevent said removable expanding clip from disengaging from said lower end.

2. The mud flap hanger of claim 1, wherein said post member is configured to be vertically inserted into a mounting bracket affixed to a vehicle chassis, said post member further comprising:
   a lower end extending below the bottom of the mounting bracket retention means for engaging the bottom of the mounting bracket and retaining said post member within the mounting bracket said retention means is one of a cotter pin, a spring latch extending from said lower end, and a removable clip.

3. The mud flap hanger of claim 1, wherein said polygonally-shaped cross-section is a generally diamond-shaped cross-section.

4. The mud flap hanger of claim 1, further comprising said polymer cladding also encases said post member.

5. The mud flap hanger of claim 1, further comprising a stiff polymer cladding encasing said post member.

6. A mud-flap equipped vehicle having chassis-mounted mud flaps, said vehicle comprising:
   a mounting bracket affixed to said vehicle's chassis, said bracket defining a channel having first and second open ends, said open ends being defined by respective perimeter ledges;
   a mud flap hanger comprising:
   a post member configured to be inserted into said channel through said first open end, said post member having a first end and a second end, said second end of said post member including a downward protrusion;
   a removable spacer clip including an aperture for receiving said downward protrusion to prevent said clip from disengaging from the second end of said post member;
   a hanger arm extending laterally from the first end of said post member and comprising a substantially inelastic polymer outer molding encasing a flexible rod, said hanger arm being one of a straight configuration and an angled configuration;
   a plurality of clips for suspending a mud flap from said hanger arm, said clips shaped to conform to the cross-section shape of said hanger arm.

7. An apparatus for mounting a mud flap to a vehicle chassis, said apparatus comprising:
   an elongated hanger arm having a flexible elongated core encased in a relatively rigid molding;
   a post member from which said elongated hanger arm laterally extends, said post member configured to attach said apparatus to said vehicle chassis; and
   means for retaining said post member within a channel of a chassis mounting backet.

\* \* \* \* \*